United States Patent [19]
Eilert et al.

[11] Patent Number: 5,095,420
[45] Date of Patent: Mar. 10, 1992

[54] METHOD AND SYSTEM FOR PERFORMING VIRTUAL ADDRESS RANGE MAPPING IN A VIRTUAL STORAGE DATA PROCESSING SYSTEM

[75] Inventors: Catherine K. Eilert, Wappingers Falls; Donald H. Gibson, Salt Point; Kenneth G. Rubsam; Casper A. Scalzi, both of Poughkeepsie; Richard J. Schmalz; Eugene S. Schulze, both of Wappingers Falls, all of N.Y.

[73] Assignee: International Business Machines, Armonk, N.Y.

[21] Appl. No.: 274,062

[22] Filed: Nov. 21, 1988

[51] Int. Cl.⁵ .................................. G06F 12/08
[52] U.S. Cl. .................. 395/400; 364/246.3; 364/254; 364/254.6; 364/254.3; 364/256.3; 364/256.4; 364/256.5; 364/280; 364/286.3; 364/966.1; 364/966.4; 364/976; 364/978; 364/978 R; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,145,738 | 3/1979 | Inoue et al. | 364/200 |
| 4,584,639 | 4/1986 | Hardy | 364/200 |
| 4,592,011 | 5/1986 | Mantellina et al. | 364/900 |
| 4,742,447 | 5/1988 | Duvall et al. | 364/200 |
| 4,758,946 | 7/1988 | Shar et al. | 364/200 |
| 4,774,659 | 9/1988 | Smith et al. | 364/200 |
| 4,787,031 | 11/1988 | Karger et al. | 364/200 |
| 4,835,685 | 5/1989 | Kun | 364/200 |
| 4,979,098 | 12/1990 | Baum et al. | 364/200 |
| 4,985,828 | 1/1991 | Shimizu et al. | 364/200 |
| 4,985,829 | 1/1991 | Thatte et al. | 364/200 |

FOREIGN PATENT DOCUMENTS 0315945 11/1988 Japan .

OTHER PUBLICATIONS

"Pilot: An Operating System for a Personal Computer", D. Redell et al., Communication of the ACM, vol. 23, No. 2, Feb. 1980, pp. 81-92.

Primary Examiner—Thomas C. Lee
Assistant Examiner—Mehmet Geckil
Attorney, Agent, or Firm—William B. Porter

[57] ABSTRACT

A linear data set is mapped to one or more non-main storage virtual data spaces. Portions of this data space are then selectively mapped to a "window" in an address space in which an application is executing, and changes made in this "window" are temporarily saved in the data space. After completion of processing, the application may permanently save changed data from the data space to the linear data set.

The technique for mapping the data space to the address space may be used to map between two address spaces, and may be extended to encompass third and subsequent spaces, so that a reference to a mapped address in the first space will ultimately be interpreted as a reference to an address in the last mapped space.

14 Claims, 14 Drawing Sheets

FIG. 2
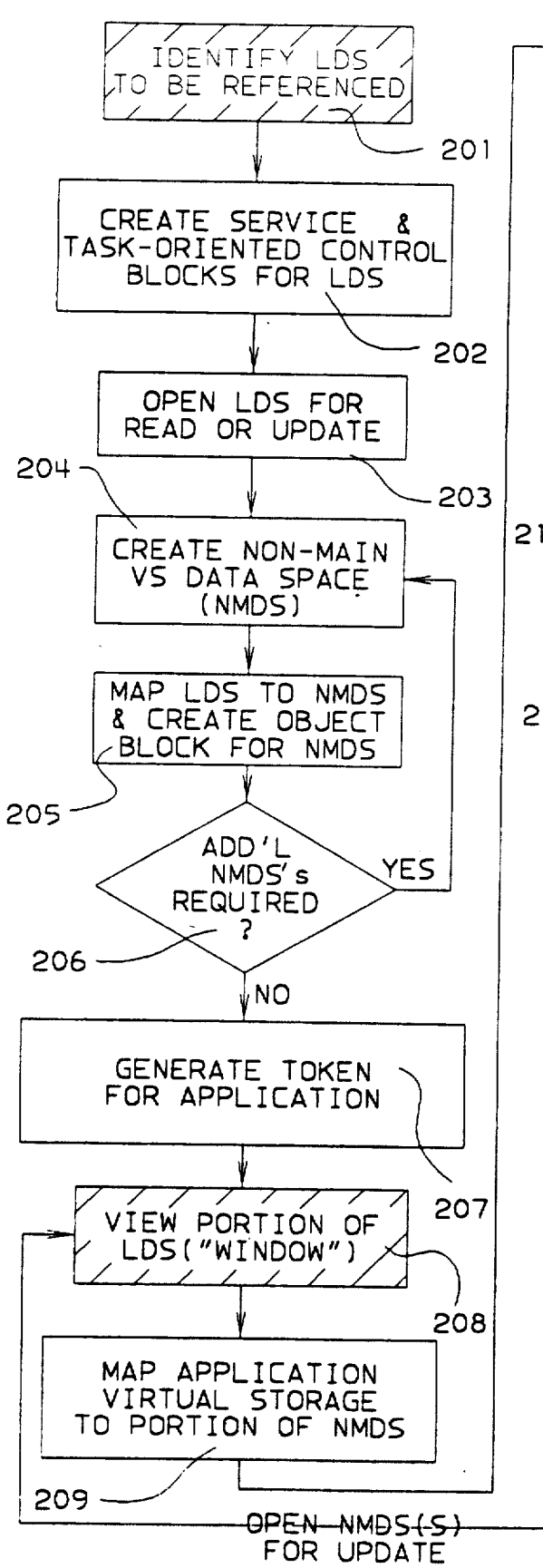
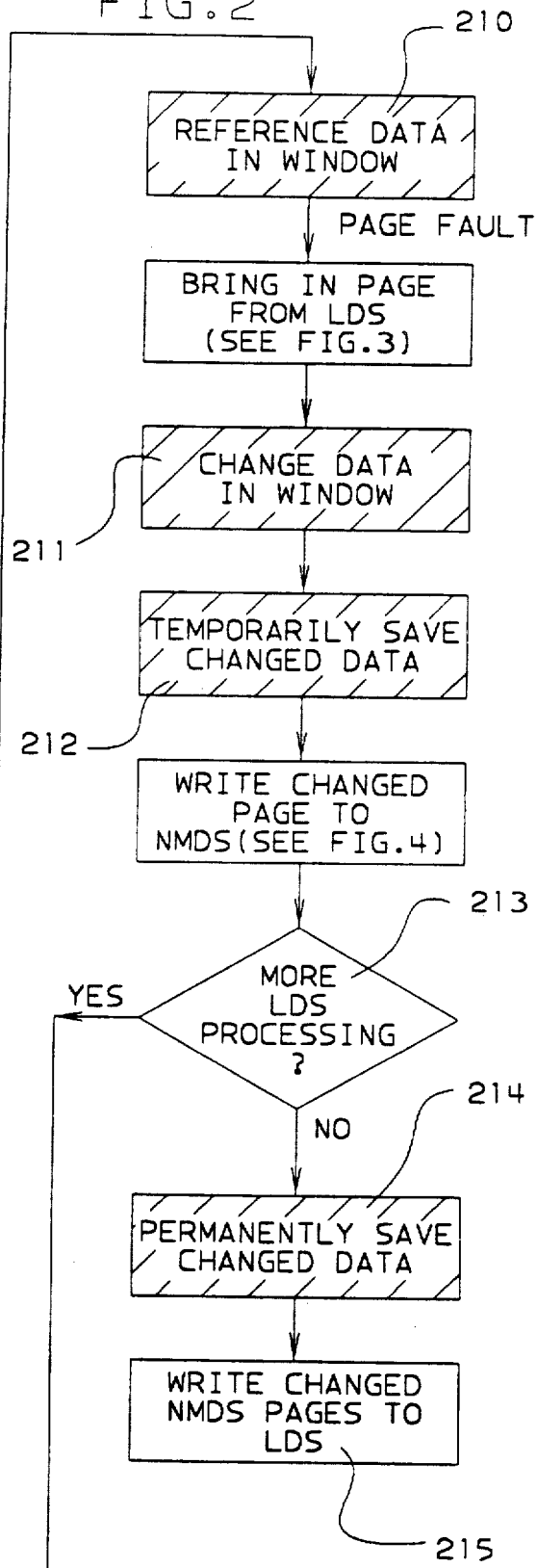

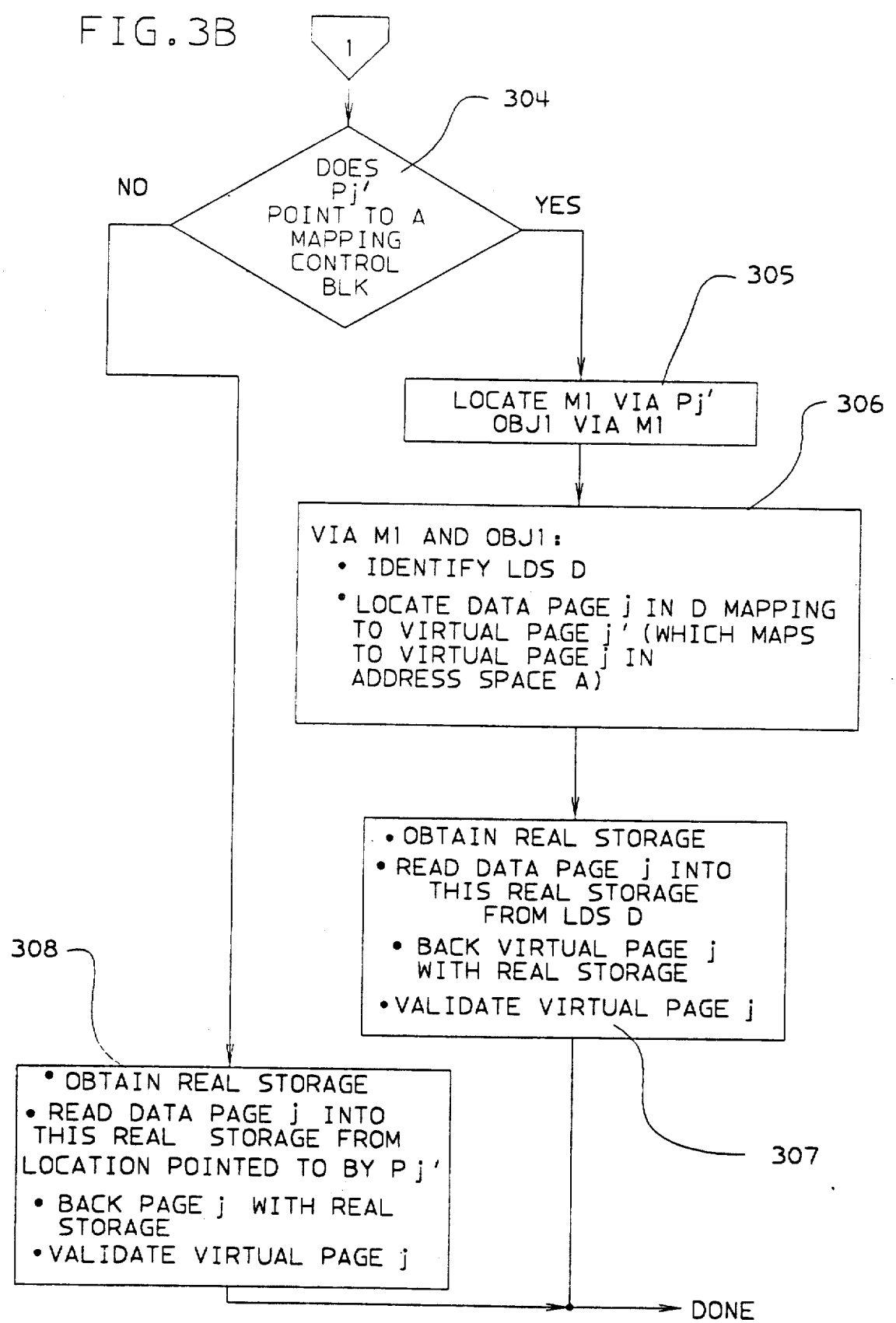

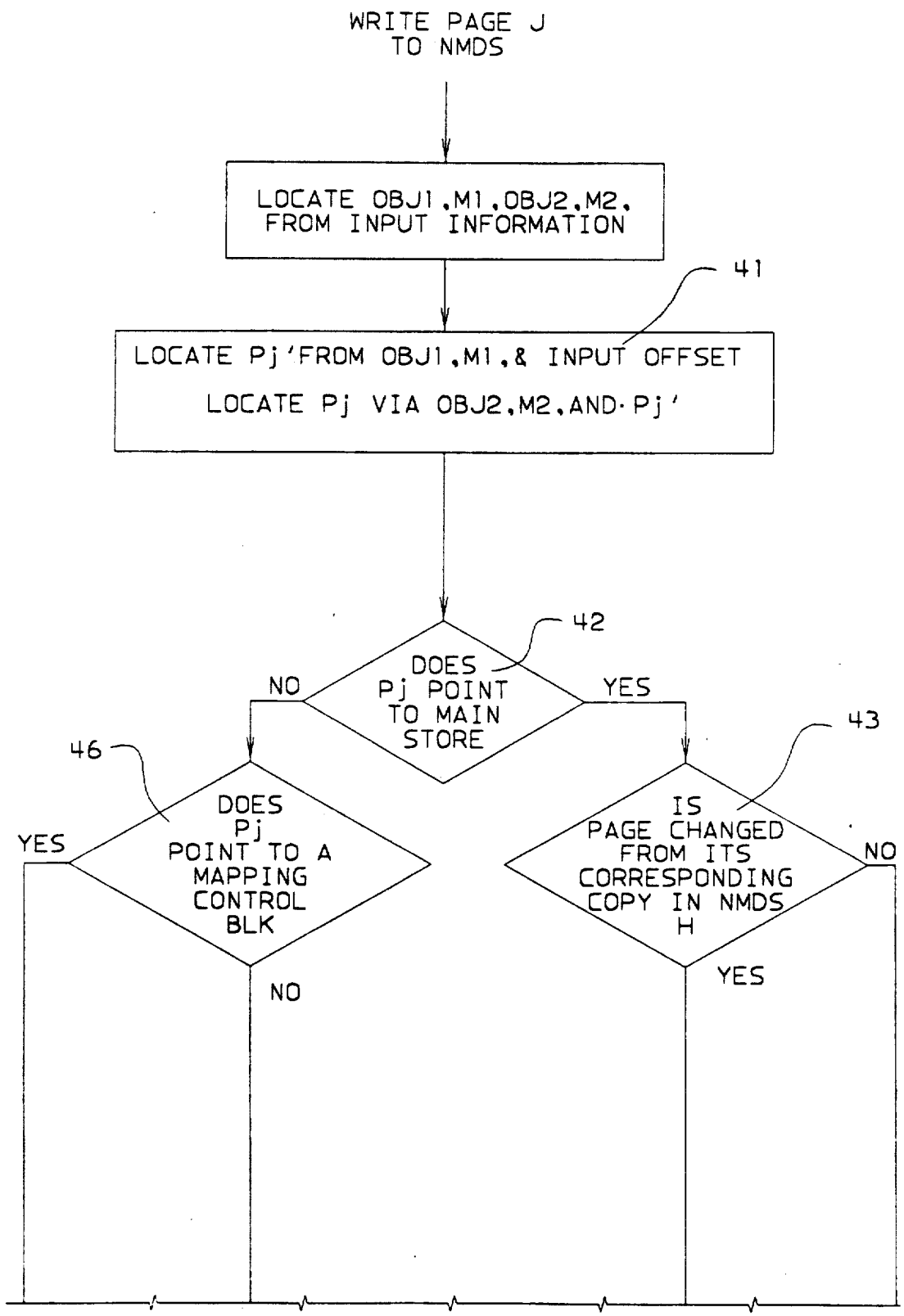

METHOD AND SYSTEM FOR PERFORMING VIRTUAL ADDRESS RANGE MAPPING IN A VIRTUAL STORAGE DATA PROCESSING SYSTEM

CROSS REFERENCE TO RELATED APPLICATIONS

This application contains subject matter which is related to the subject matter of the following applications filed on Feb. 10, 1988 and assigned to the same assignee: "Control Mechanism for Zero-Origin Data Spaces", by C. A. Scalzi, et al., (Ser. No. 154,688; "Linkage Mechanism for Program Isolation", by R. I. Baum, et al., (Ser. No. 154,733); "Home Space Facility" by C. E. Clark, (Ser. No. 154,780); "Access Register Translation Means for Address Generating Mechanism for Multiple Virtual Spaces", by R. I. Baum et al., (Ser. No. 154,689); "Nonhierarchical Program Authorization Mechanism", by R. I. Baum, et al., (Ser. No. 154,740); "Domain Related Access Lists", by C. E. Clark, et al., (Ser. No. 154,685); and "Method and System for Storing Data in and Retrieving Data from a Non-Main Storage Virtual Data Space" (Ser. No. 07/274,039), by K. Rubsam, et al., filed on even date herewith and also assigned to the same assignee. These co-pending applications are incorporated by reference herein.

FIELD OF THE INVENTION

This invention relates to the field of systems control programming. More specifically, it relates to methods for mapping and viewing from a virtual address space, data residing on a data set on an external device, or in another virtual address space, or in a data space.

DESCRIPTION OF THE PRIOR ART

Mapping of data is a well known programming technique. In most simple usage, it consists of providing a template, or mapping macro, which is used as a logical overlay of different storage areas so that data within a mapped storage area may be referenced by indicating the beginning of the mapped area, and the name of a field within the template indicating a displacement within the mapped area.

A different sort of data mapping is accomplished when a given virtual storage address within an addressing range is "mapped" to a particular real storage address. Whereas the first noted form of mapping simply permits a particular area of storage to be conveniently "named", this mapping makes an association between two different addresses—here, between a virtual address and a real address. This form of mapping is conventionally used in virtual storage systems where, for example, "Page Tables" are used to define the mapping—holding virtual storage addresses, and associated real storage addresses (see, e.g., IBM Enterprise Systems Architecture/370, form #SA22-7200).

In still another form of mapping, similar to the one last mentioned, a virtual storage address is mapped to an offset into a data set residing on a form of external storage such as DASD (Direct Access Storage Device), in a manner that enables the I/O required when a program references the mapped virtual storage to be performed by the paging subsystem, without the need for an explicit READ operation by the referencing program. Such a system is disclosed, e.g., in U.S. Pat. No. 4,742,447 to Duvall et. al., and assigned to the assignee of this application, and also exists in the "Data In Virtual" mechanism of MVS/XA (see, e.g., MVS/Extended Architecture Supervisor Services and Macro Instructions (GC28-1154); An Introduction to Data-in-Virtual (GG66-0259); MVS Extended Architecture System Logic Library: Data-in-Virtual (LY28-1655)).

SUMMARY OF THE INVENTION

In accordance with the present invention, a mapping technique is presented whereby a virtual address range in a first address space can be associated with an address range in a second space (be it on address space or a data space) so that a reference to an address within the range in the first address space is interpreted as a reference to a corresponding address within the range in the second space; further, this technique is extendable so that the second space can be mapped to a third space, and so on, so that any reference to an address in the first address space in this chain is interpreted as a reference to a corresponding address in the last space in this chain.

Using this mapping technique, in response to a request from an application program in an address space to "view" a portion of a data set on an external medium, a virtual storage address range in the local address space is mapped to an address range in a non-main storage data space (NMDS), which range is then mapped to the "to-be-viewed" portion of the data set. Data within the range to be viewed may then be viewed by simply referencing the corresponding virtual location within the local address space, which causes a page fault, which the paging control blocks will resolve to page control blocks in the NMDS, which will result in data being brought in from the data set. When it is desired to view a different portion of the data set, the view is shifted—causing remapping, and data from the former view may be temporarily saved in the mapped portion of the non-main storage data space. Finally, after all processing of data from the data set is completed by the application program, the application program may indicate that temporary modifications be made permanent. In this event, changed pages from the non-main storage data spaces are copied to the original data set on the external medium, replacing the original contents.

It is an object of the present invention to provide a system and method for mapping virtual address ranges between address/data spaces; and, further, to make the mapping extensible so that a first range may be mapped to a second, the second to a third, and so on.

It is a further object of this invention to provide a system and method for viewing and making temporary changes to a Linear Data Set (LDS), from an address space.

It is a further object of this invention to allow MVS/ESA application program to reference and modify data in separate address/data spaces without the requirement of executing in "AR" (Access Register) mode.

It is still a further object of this invention to allow changes to a LDS by an application program to be temporarily saved outside the application program's address space, without committing the changes to the LDS, even though the amount of changed data exceeds the bounds of a single address/data space.

Objects and advantages other than those mentioned above will become apparent from the following description, when read in connection with the drawings.

BRIEF DESCRIPTION OF THE DRAWINGS

FIG. 2 is a flow chart showing the steps involved in mapping, temporarily saving, and permanently saving data using this invention.

FIGS. 3A and 3B are flow charts showing the invention logic involved when an application program in an address space references data existing only in a DASD data set, or in a non-main storage data set.

FIGS. 4A and 4B are flow charts showing the invention logic involved when an application program in an address space saves changed data in a non-main storage data set.

DESCRIPTION OF THE PREFERRED EMBODIMENT

Figure 1:
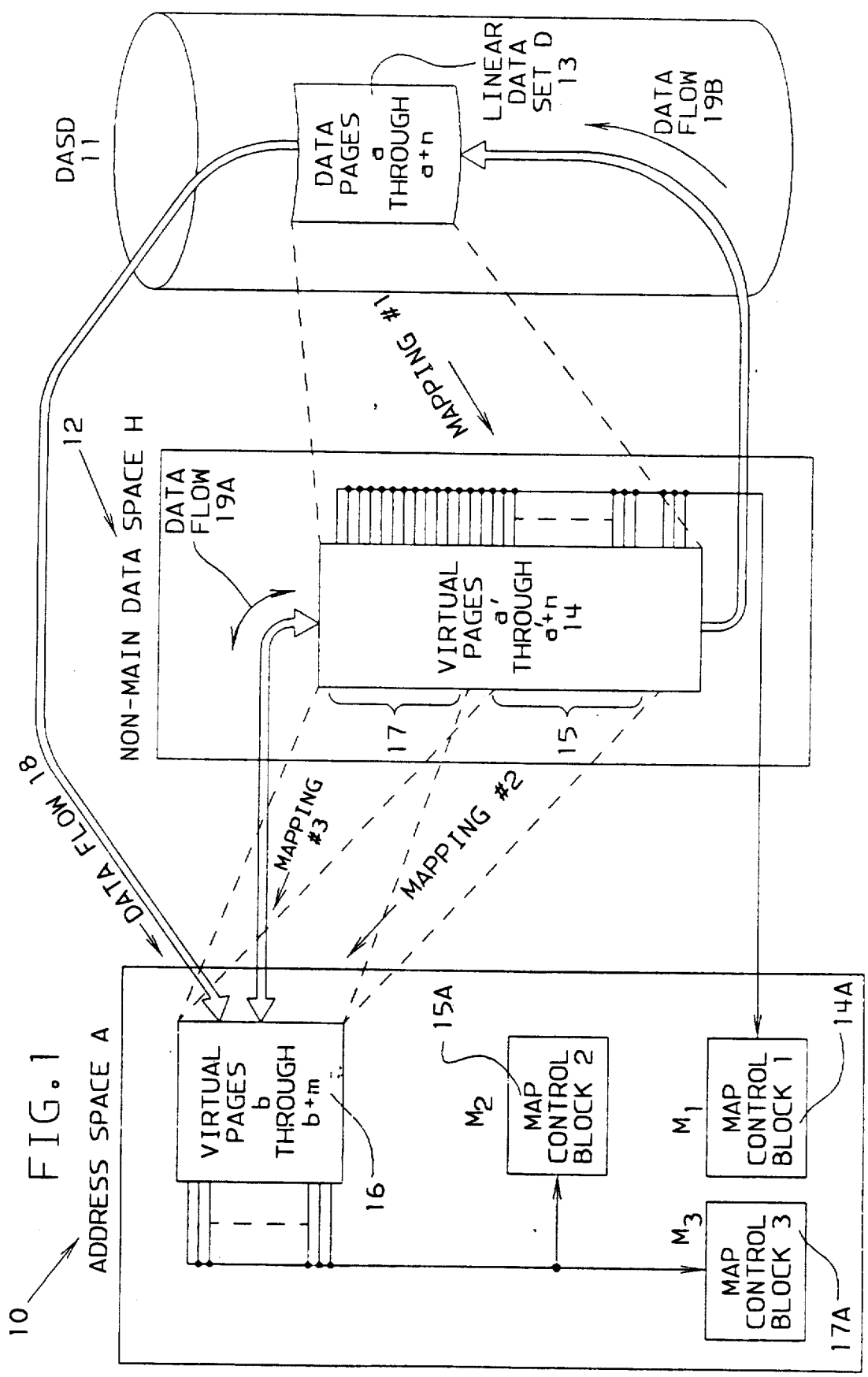
FIG. 1 is a data flow diagram illustrating the mappings used in this invention, and the data flow when data is referenced or changed.
Figure 10:
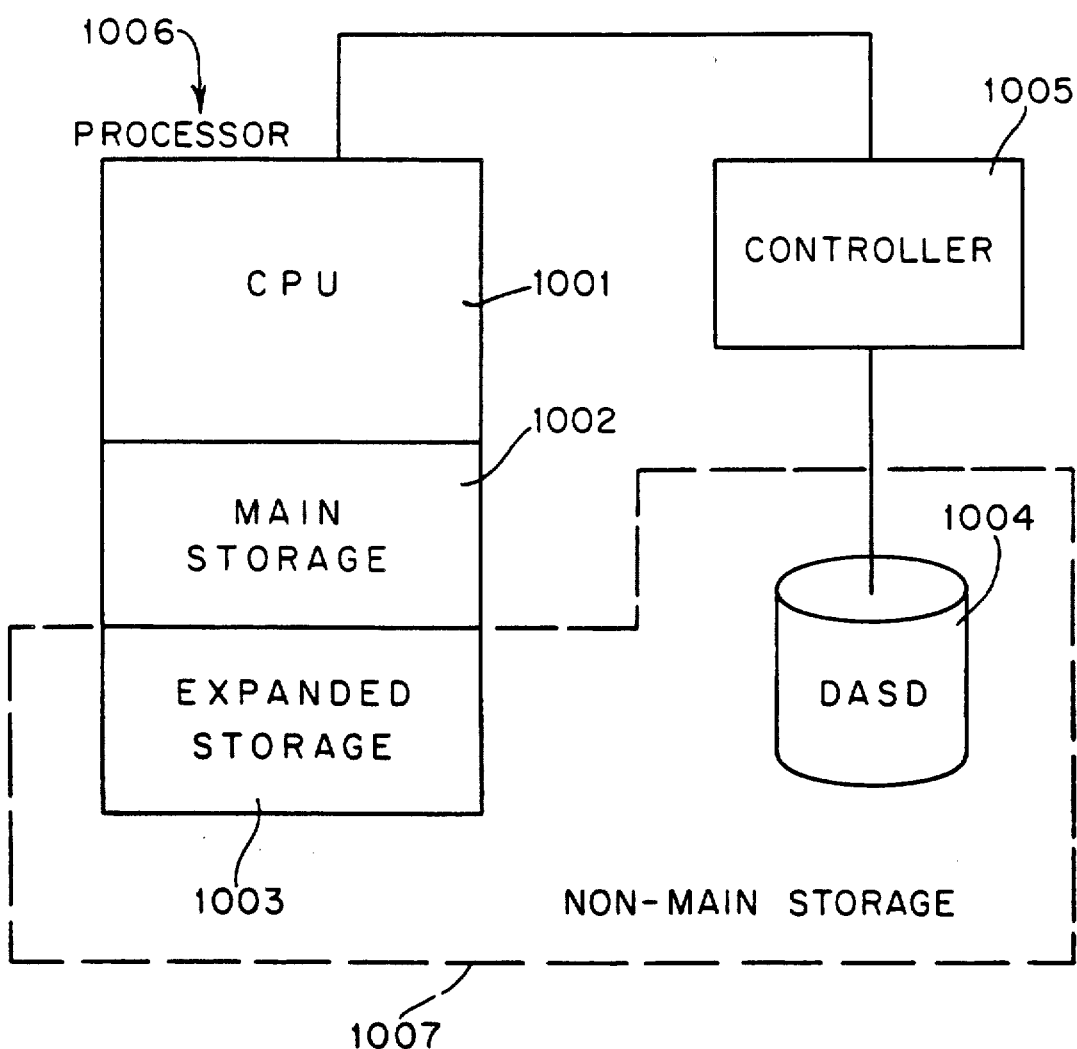
FIG. 10 is a system overview diagram illustrating a conventional computer system on which the present invention operates.
Figure 11:
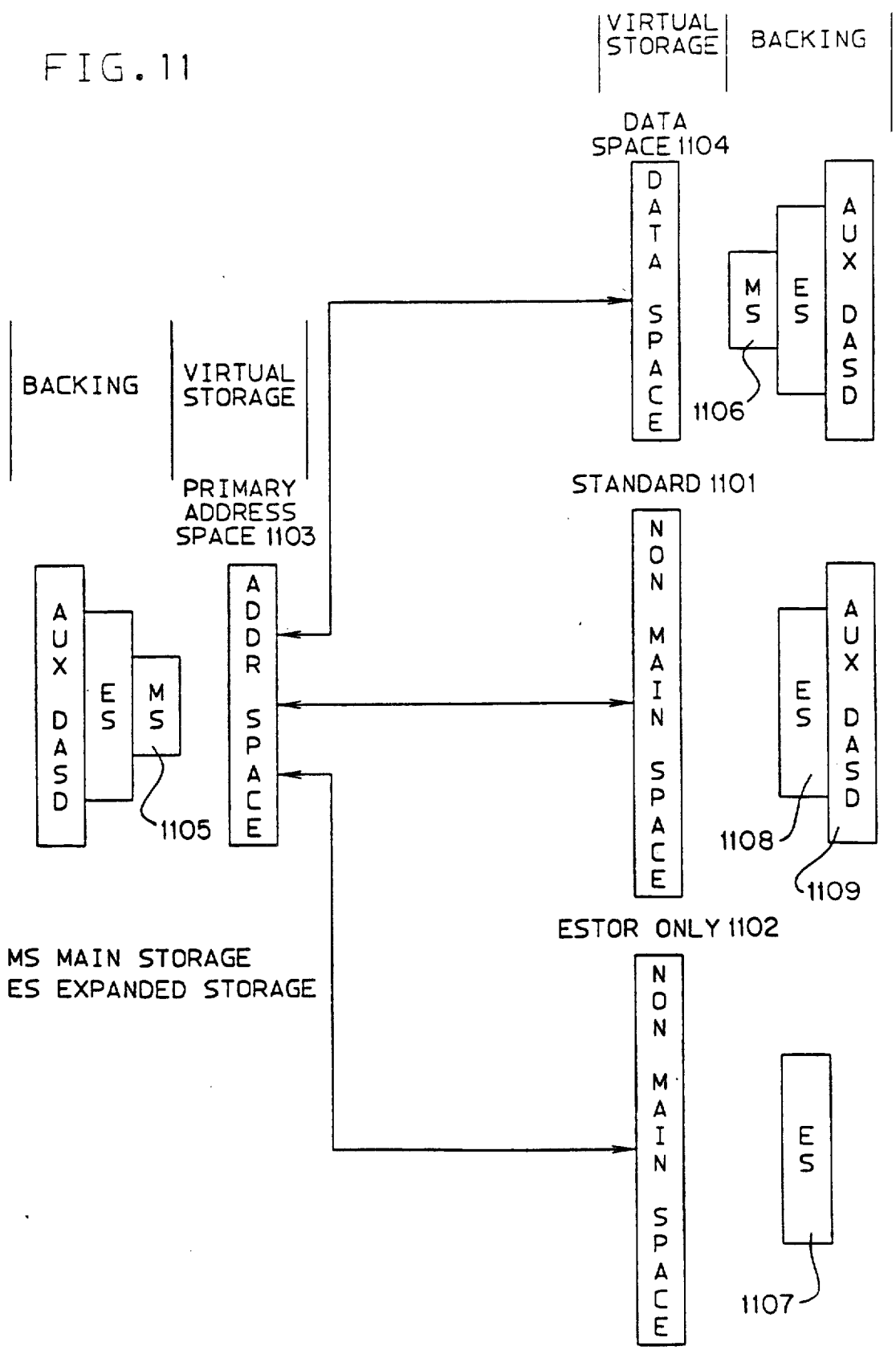
FIG. 11 is a block diagram illustrating the logical difference between a main storage data space, and the two forms of non-main storage data spaces.

FIG. 1 is an overview of the preferred embodiment in which an application program executing in address space A 10 uses the invention to view and manipulate data in Linear Data Set (LDS) D 13 on DASD device 11. A non-main virtual storage data space (NMDS) H 12 is used as a temporary repository for changed data—the characteristics of the NMDS being the subject of the previously mentioned application (Ser. No. 07/274,039) by K. Rubsam, et al.. (FIG. 10 illustrates a conventional computer system on which the present invention operates comprising a CPU (1001), a main storage (1002), expanded storage (1003), and a Direct Access Storage Device (1004) connected through a controller (1005) to the processor (1006). The term "non-main storage" as used in this description includes both DASD and expanded storage 1007. FIG. 11 presents a logical view of two embodiments of the non-main storage data spaced used on the processor in conjunction with this invention: A "standard" non-main storage data space 1101 (Standard NMDS), and an expanded storage only (ESO) non-main storage data space (ESTOR NMDS) 1102. The most significant difference lies in the fact that virtual pages in the two NMDS's 1101, 1102 may never by "backed" by main storage, while both an address space 1103 and a data space 1104 may have virtual pages backed by main (real) storage 1105, 1106. In an ESTOR NMDS 1102, virtual pages can be backed only by expanded storage 1107, while a standard NMDS 1101 can have virtual pages backed by either expanded storage 1108, or auxiliary storage 1109.

The data pages on DASD comprising the LDS 13 are mapped to a virtual range 14 within the NMDS 12, using Map Control Block 1 14A and a mapping technique known in the prior art for mapping DASD to address spaces (analogous to the methods noted above—the MVS DIV technique noted in the system of Duvall et al., (U.S. Pat. No. 4,742,447)); a subset 15 of this range 14 is then mapped to a virtual range 16 within address space A 10, using map control block M2 15A and a novel mapping technique, described more fully below, wherein a page fault on some page in the mapped range 16 will result not in I/O to an external DASD devices, as in the DIV mapping of the prior art, but in the identification of a virtual address within another virtual space (here, a NMDS). In this example, data to be viewed and changed is temporarily accessed (data flow 18 or 19A) and saved (data flow 19A) in the NMDS range 15. Subsequently, the address space range 16 is re-mapped via map control block M3 17A to range 17 within the NMDS, allowing the application program to view (data flow 18 and 19A) and temporarily save (data flow 19A) changed data within range 17. Note that when data has been saved in the NMDS, subsequent mappings result in that data being retrieved via data flow 19A rather than from DASD 11 via data flow 18. After all operations on the LDS are complete, the application program can permanently save all changed data on the LDS (data flow 19B).

In FIG. 2, the steps involved in this embodiment are shown in greater detail. The cross-hatched steps are those actions taken by the application program executing in address space A (FIG. 1 at 10), while the non-hatched steps are performed by the operating system.

First, the application program identifies the LDS which it will be working with 201. In doing this, it specifies the DDNAME or Data Set Name, and type of access (READ or UPDATE), which enables the operating system to extract identifying information from DASD (size, location on DASD) and construct 202 a task oriented control block OBJ1 representing this extracted data and usage of the LDS (FIG. 5A at 501) and a services block 507 representing the request. OBJ1 is anchored in the services block. The LDS is then opened for READ or UPDATE in conventional fashion 203.

Next, the system 204 creates a NMDS 527, conventionally creating a segment table (FIG. 5A at 502) and page tables (503A to 503N). An identifying STOKEN 504A is provided in services block 507 for subsequent references to the NMDS by the operating system.

Figure 5A:
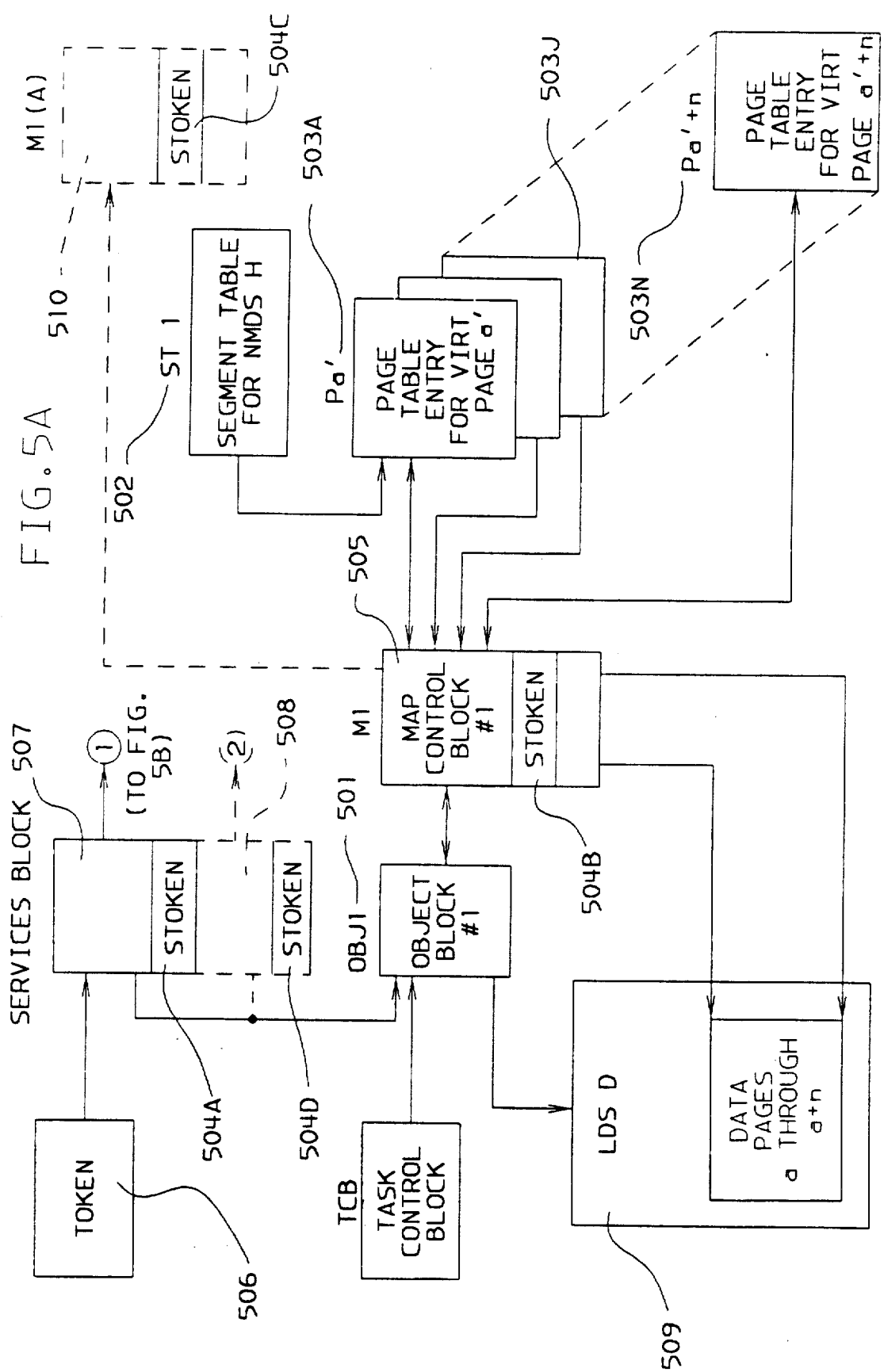
FIGS. 5A, 5B and 5C present an overview of the control block structure used in the preferred embodiment.
Figure 5B:
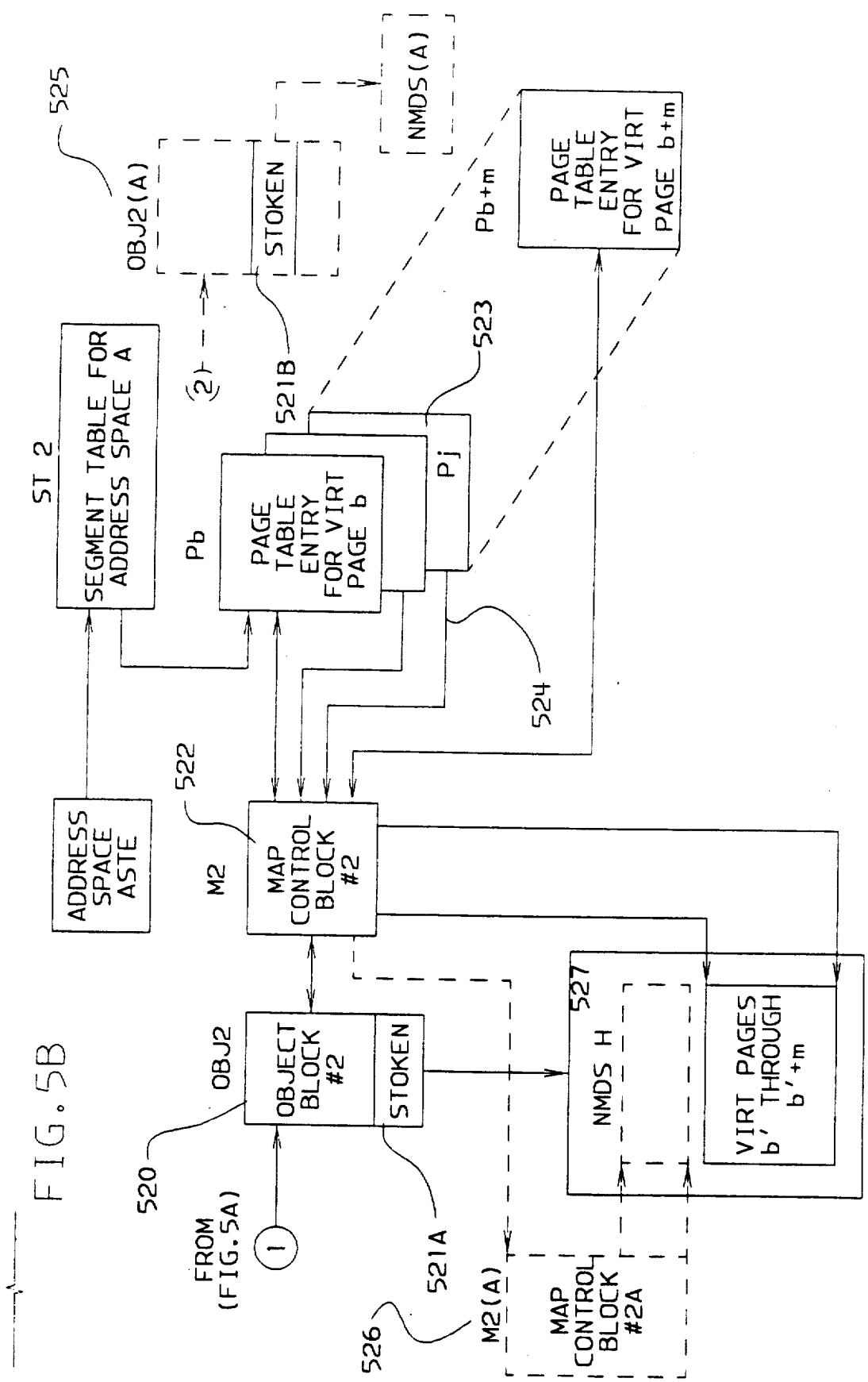
Figure 5C:
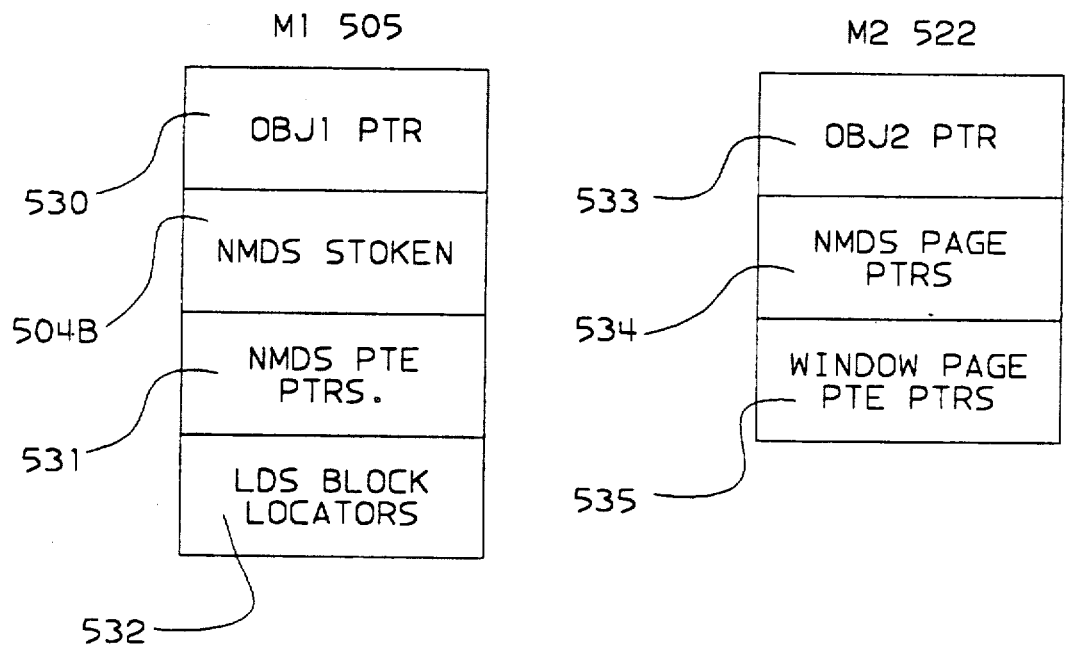
Figure 6:
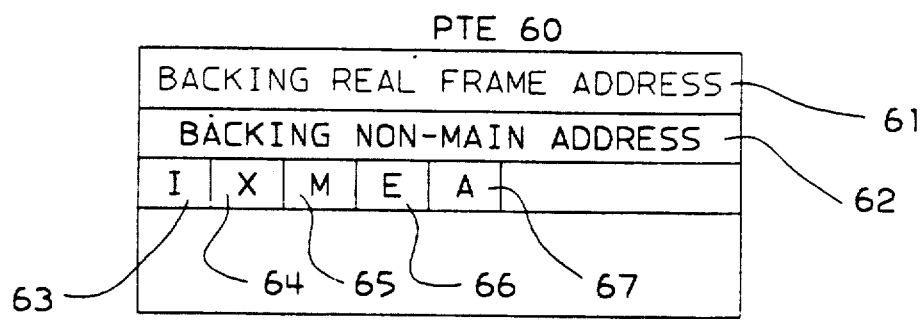
FIG. 6 is a control block layout diagram, showing the format of portions of a page table entry (PTE) relevant to this invention.
Figure 9:
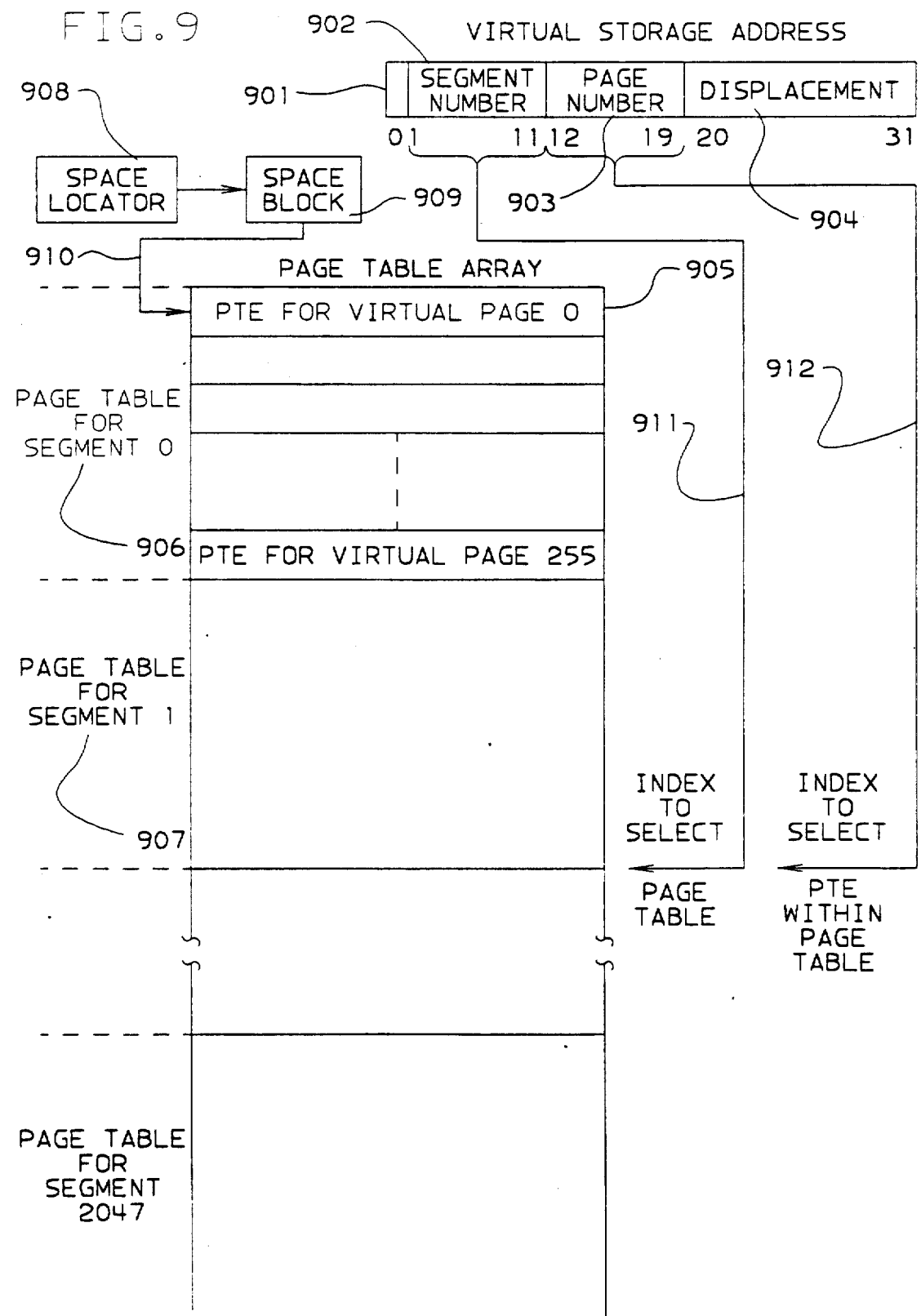
FIG. 9 is a block diagram illustrating the relationship between the virtual address of a page, and the virtual address of that page's page table entry.

Next, using conventional data-in-virtual mapping techniques, the LDS 509 is mapped 205 to the NMDS. In accomplishing this, a mapping control block M1 (FIG. 1 at 14A; FIG. 5A and 5C at 505) is created describing the one-to-one correspondence between data pages a to a+n and virtual pages a' to a'+n. LDS data page a+i ($0 \leq i \leq n$) maps to NMDS virtual page a'+i; it is therefore trivial to map any physical address within data page a+i to a virtual address within NMDS page a'+i. M1 is chained off OBJ1 501, which uniquely identifies the LDS 509. As shown in FIG. 5C, M1 contains the NMDS STOKEN 504B, the starting and ending virtual addresses of the page table entries representing the range being mapped 531 (i.e., pointers to Pa' and Pa'+n), the starting and ending block numbers (i.e., the LDS "addresses") of the data pages in the LDS which map to the virtual range 532 (i.e., pointers to data pages a and a+n), and a pointer 530 to OBJ1 501—all of which represent this mapping of LDS data pages to NMDS virtual pages. Initially, each mapped page table entry in the NMDS 503A to 503N is set to point to control block M1 505. It should be noted that all page table entries for an address space or a NMDS point to real (main) storage, if the page is "backed" by such real (main) storage, and also point to the last non-main storage location of the data page—which may be expanded or auxiliary storage or, as here, a pointer to a map control block when the data page is in a mapped LDS data object, or in a mapped NMDS. FIG. 6 illustrates the structure of these page table entries 60 (PTE's), containing: an indicator I 63 whether the virtual page associated with this PTE is backed by real storage and the PTE also contains the address 61 of the backing page; if ON, it is not backed (is "invalid"), and a reference to a virtual address within this page results in a page fault.); an indicator X 64 whether the page is backed by non-main storage (if ON, the page is backed by non-main storage, and the address (pointer) to the non-main storage is also in the PTE 62); an indicator M 65 that the page is backed by a NMDS or LDS page (if ON, and flag X 64 is on, then address 62 points to a mapping control block (such as M2 507); an indicator E 66 which, if ON, and flag x 64 is ON, indicates that field 62 points to an expanded storage page; and an indicator A 67 which, if ON, and flag X 64 is ON, indicates that field 62 points to an auxiliary storage page. Each virtual page in an addressing space is represented by a Page Table Entry (PTE). (Note that the page table structure described herein may be replaced by a conventional system of page tables and extended page tables, as in IBM's System/370 and System/370 ESA, without affecting the present invention. The structure described here is simplified to focus on the essentials of the invention.) The PTEs for an addressing space are all of the same size and are arranged contiguously in virtual storage in the same order as the virtual addresses of the pages that they represent. Consequently, knowing the origin of the array of PTEs, the virtual address of any given page is logically equivalent to the address of that pages PTE and vice versa. This is illustrated in FIG. 9, and explained below for clarity under "Mapping a Page Table Entry to a Virtual Page"—though the mechanism is not key to this invention.

Then a task-oriented structure OBJ2 (FIG. 5B at 520) is created to represent this usage of the NMDS (containing the STOKEN 521A associated with the NMDS). It is pointed to from the services block 507. Finally, 207 a token 506 which contains the address of the services block is provided to the application for subsequent operations against this structure.

If the NMDS 527 is not sufficiently large to contain all the LDS data (2 gigabytes of LDS data can be mapped into one NMDS), then additional NMDS's are created 206, each with a unique STOKEN. The NMDS's are logically chained together in the following fashion:

1. An additional map control block M1(A) (510 in FIG. 5A) is constructed and chained to the previous map control block M1 505. Each new map control block contains:
    the STOKEN 504C of the additional NMDS being mapped.
    the starting and ending virtual addresses of the page table entries representing the range in the additional NMDS being mapped.
    the starting and ending block numbers of those data pages in the LDS which map to the virtual storage pages of the additional NMDS.
2. An additional object block OBJ2(A) 525 is created to represent the usage of the additional NMDS and contains the STOKEN 521B of this NMDS.
3. An additional entry is created in the services block 508 which contains:
    the STOKEN 504D of the additional NMDS.
    A pointer to OBJ1 501.
    A pointer to the additional object block OBJ2(A) 525.

The position of each entry in the services block and the position of each map control block in the chain of map control blocks is indicative of which data pages in the LDS that they represent. That is, If each NMDS is mapped by q LDS data pages then the xth entry in the services block and the xth map control block represent LDS data pages $(x-1)q+1$ through $xq$.

An application program (application) indicates which pages are pertinent to a request by specifying the token 506, the offset within the LDS of the first data page applicable, and the number of contiguous pages. Because of the layout of the service block entries and map control block queues as explained previously, the system can locate the appropriate control blocks as follows:

With the token 506 the system locates the services block and with the specified data page range (indicated by offset and number of pages), the system locates the correct entry(s) in the services block.

The services block entry(s) then points to the correct object block OBJ1 501. OBJ1 then points to a chain of map control blocks M1 505 (M1(A) 510 etc.). With the input data page range, the system can locate the correct map control block in the chain.

OBJ2 520 (or OBJ2(A) 525 etc.) can also be located by the pointer in the services block entry(s) 507, 508.

Now the application program is in a position to define a "window" 208 into the LDS 509. To accomplish this, the application program specifies the previously mentioned token 506, the virtual address of the address space window, and the offset of the first data page in the LDS to be viewed in the first page of the window, and the size of the window. The system maps 209 the application "window" to that portion of the NMDS527 that maps, via M1 505, to the portion of the LDS specified in the application program's request, by building a structure M2 (FIG. 1 at 15A; FIG. 5B and 5C at 522), which describes the one-to-one correspondence between virtual pages of a window b to b+m in the address space and the corresponding virtual pages in the NMDS range b' to b'+m (FIG. 1 at 15). NMDS virtual page $b'+i$ $(0 \leq i \leq m)$ maps to window page $b+i$; it is therefore trivial to map any virtual address within NMDS page $b'+i$ to a virtual address within window page $b+i$. M2 522 is chained off OBJ2 520, which uniquely identifies the NMDS 527. As shown in FIG. 5C, M2 contains the starting and ending virtual addresses of the page table entries (Pb and Pb+m) of the pages being mapped 535—the "window"; the starting and ending virtual addresses of the range in the NMDS that maps to the address space window 534 (b'and b'+m); and a pointer 533 to OBJ2. This map control block represents the mapped virtual storage in the user "window". Each page table entry Pb to Pb+m is then set to point to M2

522, and they are initialized as invalid by turning on the "page invalid" bit (FIG. 6 at 63) in the page table entry for each page (Pb through Pb+m); hence, a page fault will occur when any pages in this range are next referenced.

It may be seen that an application program can establish additional non-overlapping windows concurrent with the first to view portions of the same NMDS which are distinct from any other concurrent view. If an additional window is established, the system will create an additional map control block M2(A) 526 to represent this additional mapping. The additional map control block is chained to the other map control blocks which are anchored in OBJ2 520.

Since each map control block in the chain anchored from OBJ2 520 (or OBJ2 (A) 525 etc.) maps a unique portion of a NMDS to a unique window in the address space and since each portion of an entire LDS is mapped to a unique portion of a NMDS via a map control block in a chain anchored from OBJ1 501, the system is capable, given a token 506 and the offset of some data page j in an LDS, of locating the applicable map control block M2 522 (or M2(A) 526 etc.).

Figure 8:
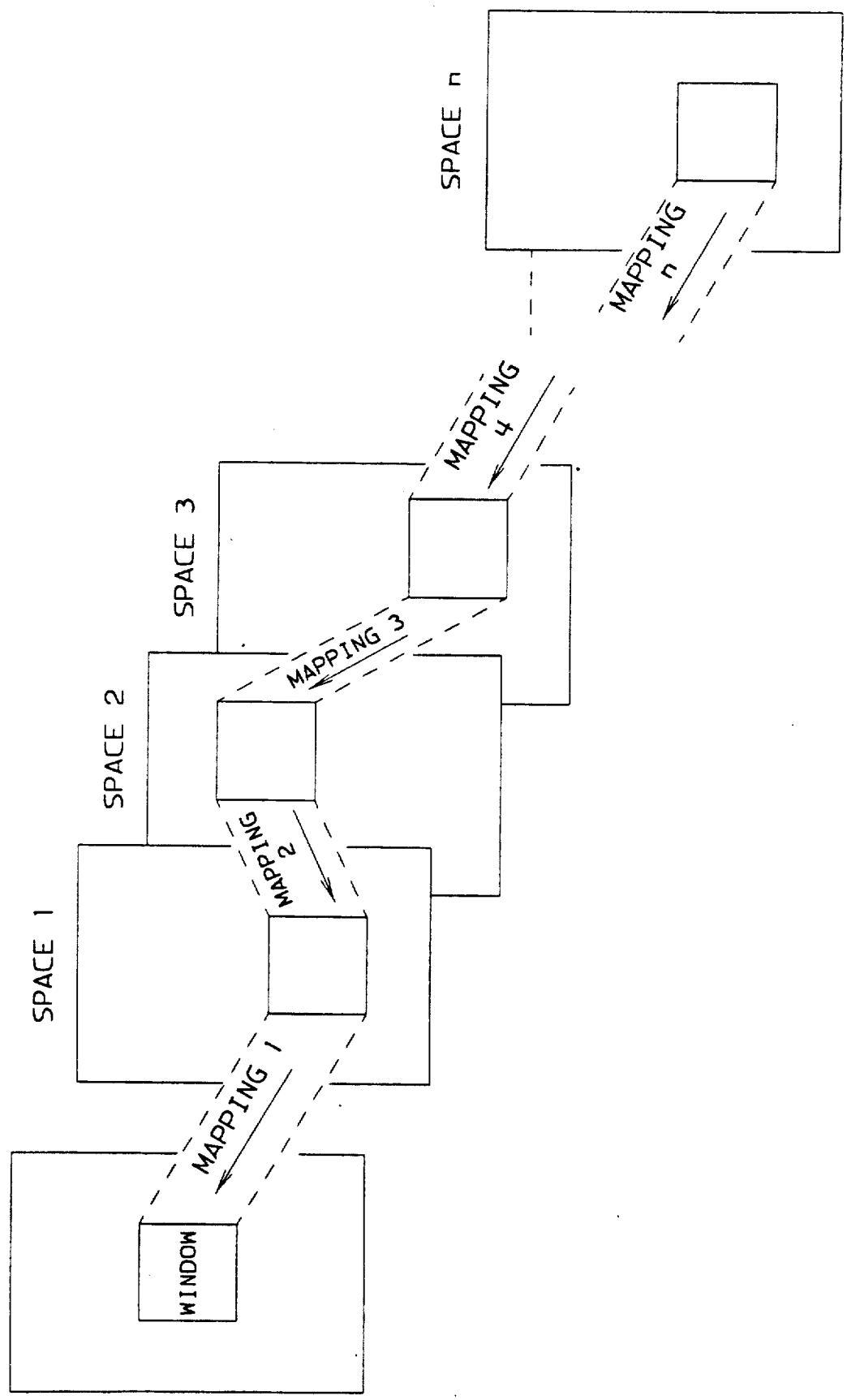
FIG. 8 is a logical depiction of a multiple mapping of an address space window, through several intermediate spaces, to an ultimate space.

It should be noted that this correspondence between the address space and the NMDS could as easily have been a correspondence between, for example, two address pages, or between an address space and a (main storage) data space; and that the correspondence could have been expanded indefinitely as shown in FIG. 8, with a third space linked to the second, and so on, so that a reference to an address in the first space is ultimately interpreted as a reference to an address in the last space.

Figure 3A:
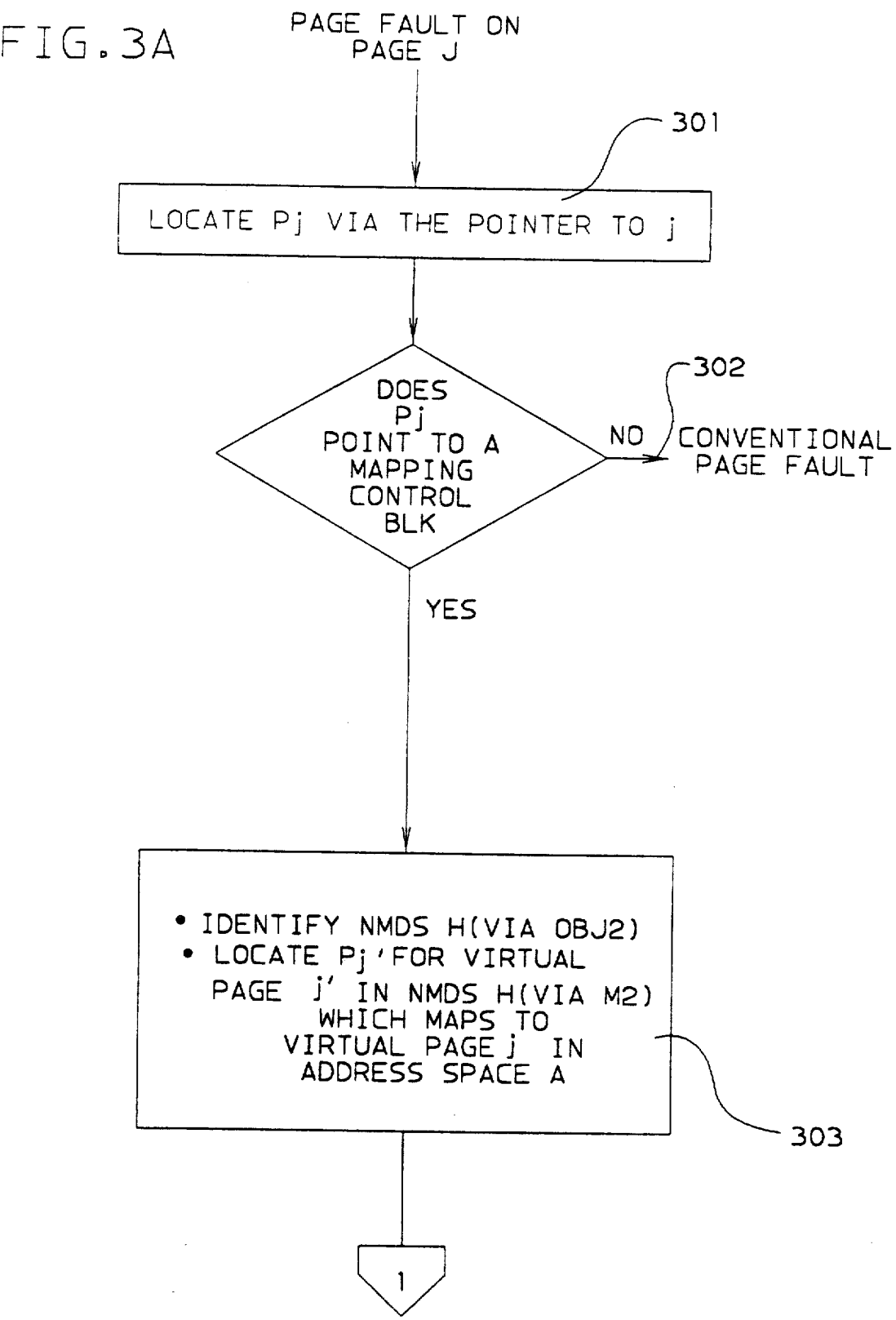

The application can now reference data in its virtual "window". Since each page in the "window" is initialized as invalid, a page fault will occur when any of the pages in the range are referenced 210. FIG. 3 describes the steps require to bring into main storage the referenced data.

First, the page table entry Pj for the referenced virtual page J (FIG. 5B at 523) is located 301 (on a page fault, hardware conventionally provides the virtual address of the fault page, and identifies the address space. From this information (as explained below under "Mapping a Page Table Entry to a Virtual Page"), Pj can be located). In this case, Pj will point 524 to map control block M2 522 as determined by flags X 64 and M 65 both being ON in the PTE 60 (If it did not, 302, we would be dealing with a conventional page fault, not a page fault for a mapped page) which points to OBJ2 520. Then 303, the operating system identifies the particular NMDS via the STOKEN 521A in OBJ2 520, and locates the page table entry Pj' 503J for virtual page j' in NMDS H 12 (FIG. 5B at 527) via M2 522 which maps to virtual page j in address space A 12.

Next, the system determines 304 whether Pj' points to a mapping control block. (This may be determined by flags X 64 and M 65 in the Page Table Entry 60—if both are "on", then field 62 contains the address of a mapping control block.) If it does, the map control block M1 505 is located 305 via the pointer to it in Pj' 503J. Then 306, via M1 14A, 505 and OBJ1 501 (located via a pointer in M1), the LDS is identified, as is data page J in LDS D 13 (OBJ1 containing the location of the LDS on DASD, and M1 containing the mapping of the data pages in the LDS to the NMDS), this data page J then mapping to NMDS virtual page J' (which, in turn, maps to address space virtual page J). Finally, 307, the system performs steps conventionally associated with page-fault processing resulting in a flow of data (FIG. 1 at data flow 18): it obtains real storage to back address space virtual page J; reads data page J from the LDS into this real storage; and validates the page table entry Pj 523 associated with address space virtual page J by placing the real storage address in the PTE 61 and turning OFF flag I 63.

If Pj' did not point 304 to a mapping control block, this indicates that the most recent version of the data exists on non-main storage backing the virtual storage of the NMDS (perhaps because the data was previously temporarily saved in the NMDS). In this case 308, the system again performs conventional page fault I/O as above at 307, except that the data flow 19A is from the NMDS backing storage to real storage, rather than from the LDS to real storage.

Having now available in real storage the page containing the necessary data, the application program is, of course, free to change this data 211. Then the application program can temporarily save the changes 212 in the NMDS.

Figure 4B:
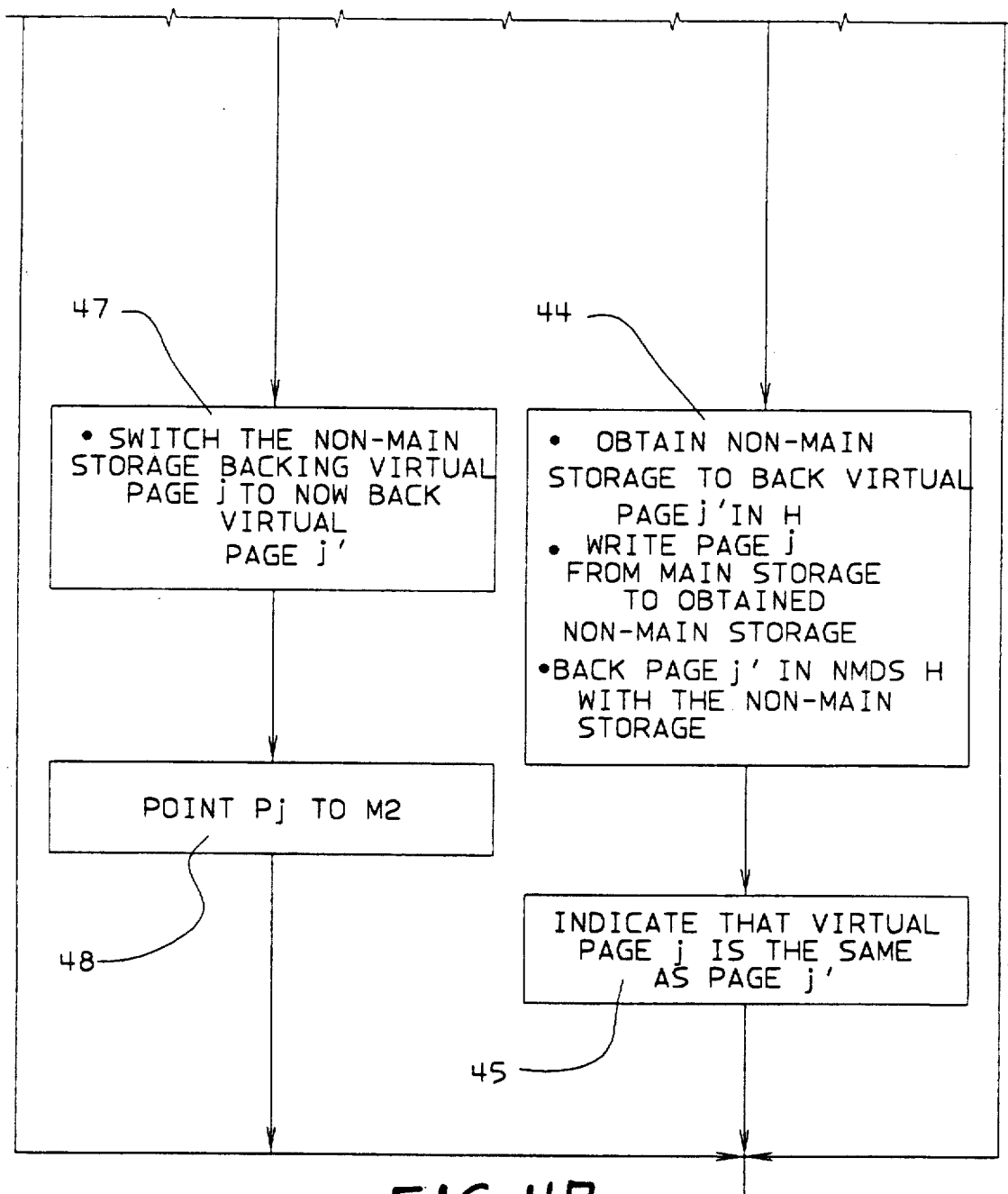

The application program requests the writing of the page(s) to the NMDS by specifying: the token 506; the offset, in the LDS 509, corresponding to the initial page (in the window) to be saved in the NMDS 527; and the number of contiguous window pages to be saved. FIG. 4 describes the system actions in response to such a request by the application program for a single page. First, using the input information, OBJ1 501, M1 505, OBJ2 520 and M2 522 are located as previously explained. Since there is a one-to-one correspondence between the data pages on the LDS 509 mapping to the NMDS 527 virtual pages, virtual page j' mapped by LDS data page j (via the input offset) can be determined using OBJ1 501 and M1 505. Using OBJ2 520 and M2 522, Pj for virtual page j which is mapped by NMDS virtual page j' can be located 41. Then a test is made 42 whether the page table entry Pj 523 for the virtual page points to a main storage page. If so, a test is made 43 whether the page J has changed as compared to its corresponding NMDS copy (indicated conventionally via the change bit associated with each system real frame—see IBM Enterprise System Architecture/370 Principles of Operation, form SA22-7200.) If it has not changed, there is not need to copy it to the NMDS; if it has changed, then a non-main storage page (either DASD, or expanded storage) is obtained 44 to back the corresponding NMDS virtual page J', the page is written, and page j' is indicated as "backed" by putting the address of the non-main storage page into the page table entry 62 Pj', and turning on flag X 64 and turning on flag E 66 or A 67 (indicating either expanded storage, or DASD storage backing). The "change bit" for page j in the address space A is turned OFF 45, since it is now identical to (unchanged from) its copy in the NMDS.

If the test 42 indicated that the page table entry Pj 523 did not point to a main storage page, then the page to be temporarily saved in the NMDS is currently not backed by real, and a further test 46 is made whether Pj 523 points to a map control block M2 (FIG. 5 at 522, FIG. 1 at 15A), which would indicate that the current version of the page has already been temporarily saved in the NMDS. If Pj does not point to a NMDS, then the associated page is on non-main storage (though not in a NMDS) backing the address space and is assumed changed from any copy in the NMDS 12, 527. In this case, the page can be "written" to the NMDS by the simple expedient 47 of switching the non-main storage backing the address space virtual page J to now back NMDS virtual page J'. This is accomplished by putting the address of the non-main storage backing (in field 62 of PTE Pj) into field 62 of PTE Pj', turning on flags X 64 and either E 66 or A 67 in PTE Pj' and 48 putting a pointer to M2 522 in field 62 of Pj and turning ON flags X64 and M65 and turning OFF flags E 66 and A67 in Pj. This "writing" is done without ever having to bring the page first into real storage!

If the application program wishes 213 to work with other portions of the LDS, it repeats the sequence beginning at 208, indicating a new portion 17 of the NMDS which is to be mapped by specifying the TOKEN 506, the virtual address of the window and a new offset of the first page in the LDS 509 to now be view, resulting in the replacement of Map Control Block M2 (FIG. 1 at 15A) with a new map control block M3 (FIG. 1 at 17A). After completing all such changing and temporary saving, the application program may indicate 214 that all changes temporarily saved in the NMDS are to made permanent by copying them to the LDS.

The application program requests that changed pages in the NMDS 527 be made permanent in the LDS by specifying:
The token 506;
Offset, in the LDS, of the first data page to be replaced by its copy in the NMDS if different;
Number of contiguous pages to be saved.

Figure 7:
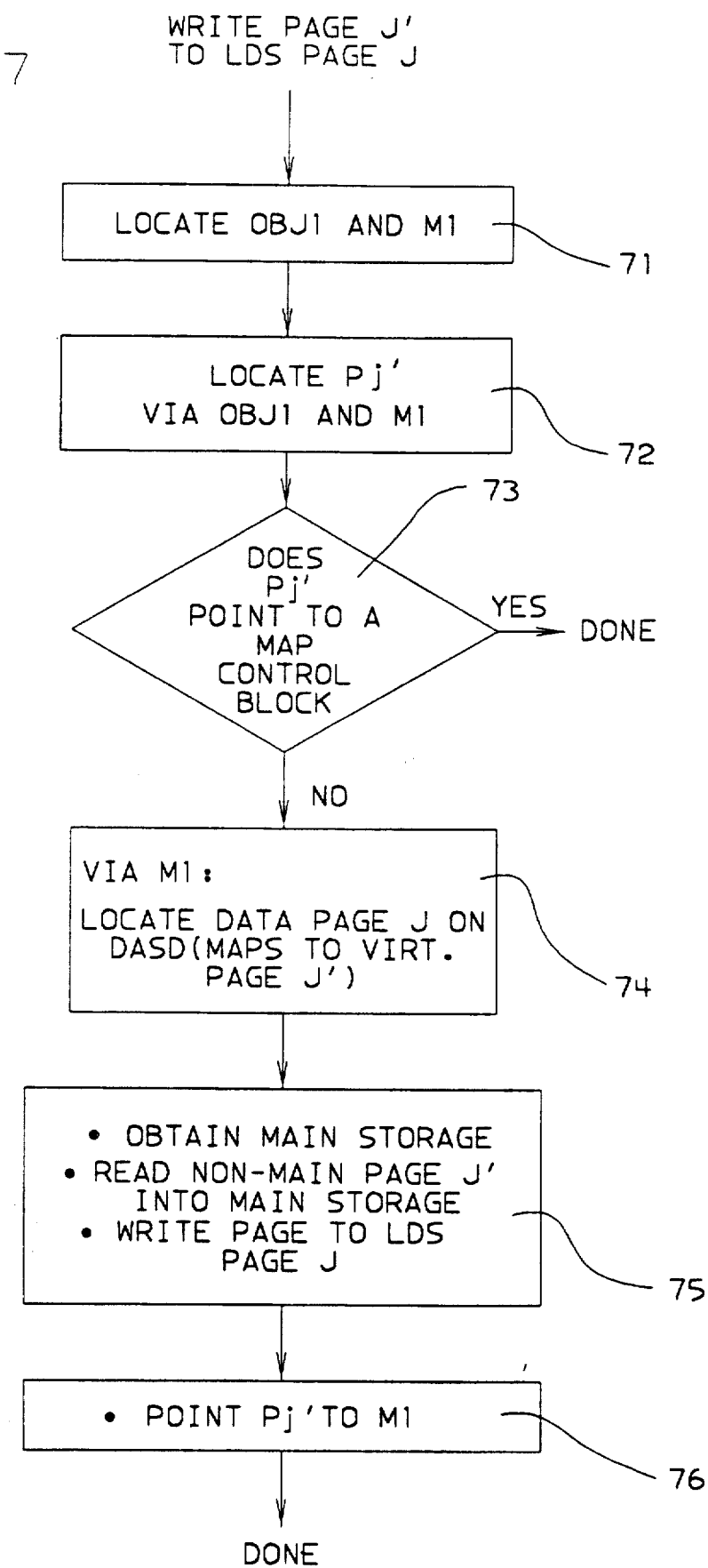
FIG. 7 is a flow chart showing the steps involved in writing a page from a NMDS to a LDS (linear data set).

FIG. 7 describes the system actions in response to such a request by the application for a single page.

The system locates 71 control blocks OBJ1 501 and M1 505 from the input information as previously explained.

Next, using OBJ1 and M1, and the input offset, Pj' can be located 72. Then a test is made 73 whether PTE Pj' 503J points to a map control block M1 505. If so, then this page is already represented in its current state on the LDS, so nothing further is required; if not, then data page j on the LDS 509 is located 74 via M1 505 (which page maps to virtual page j' in the NMDS 12). Next 75, a main storage frame is obtained, page j' is read into it from its non-main storage backing (as pointed to by field 62 in PTE Pj' 503J), and this page is then written to LDS data page j. Finally 76, PTE Pj' 503J is pointed to M1 by placing the address of M1 505 in its field 62, and turning on its flags X 64 and M 65.

Mapping a Page Table Entry to a Virtual Page

For clarity, though not essentially part of the present invention, the following explains the relation between a virtual address, and a page table entry:

A conventional 31 bit virtual storage address 901 has the capacity to address any byte in a range of 0 to 2 gigabytes − 1 inclusive. For a virtual system based on 2048 segments of 1 megabyte each where each segment consists of 256 4K byte pages, the virtual address can be partitioned into a segment number of 11 bits 902, a page number of 8 bits 903, and a displacement of 12 bits 904.

Each virtual page in the 2 gigabyte addressing space is represented by a page table entry (PTE). All PTEs for the 2 gigabyte space are each of the same length and are arranged contiguously in virtual storage in ascending order of the virtual storage they represent 905. Hence, the first 256 PTEs represent the pages in segment 0 and together form the page table for segment 0 906. The second set of 256 PTEs form the page table for segment 1 907, and so forth. Together all page tables form the page table array 905.

Now to identify any virtual byte within a system consisting of multiple 2 gigabyte addressing spaces requires that a virtual storage address be accompanied by identification (space location) of the 2 gigabyte space to which the virtual storage address applies. This may be an address space ID (ASID) for a 2 gigabyte address space or a STOKEN for a 2 gigabyte data space. In either case, the space locator 908 leads to one or more control blocks, collectively called here a "space block" 909. The "space block" contains a pointer 910 to the array of page tables representing the 2 gigabyte addressing range of the space.

Now, given the address, consisting of a space locator and a virtual storage address, of any virtual page in the system, the PTE representing the page can be located. The space locator 908 leads to the start of the page table array. The segment number 902 forms an index 911 to the page table within the array and the page number 903 forms an index 912 to the PTE within the page table.

Hence, knowing the address of a virtual page is equivalent to knowing the address of its page table entry and vice versa.

While the invention has been shown and described with reference to a particular embodiment, it should be appreciated by those persons skilled in the art that changes and modifications may be made without departing from the spirit of the invention or the scope of the appended claims.

What is claimed is:

1. In a central processing complex comprising a CPU, main storage, non-main storage, system resources connected to the CPU and the main storage, and an operating system supporting spaces comprising address spaces, main storage data spaces, and non-main storage data spaces, a method for viewing and changing linear data sets by a requesting application program in a first address space comprising:
a) the application program identifying a linear data set on external storage to be accessed;
b) the operating system mapping the linear data set to a first address range in a separate virtual space apart from said first address space;
c) the operating system mapping a subset of the first address range to a second address range in the first address space;
d) the application program accessing data in the second address range so that an associated portion of the mapped linear data set is transferred from external storage if unmodified, and from the separate virtual space, if modified, into the first address space, for viewing and modification there;
e) the operating system transferring any modified data in the second address range to the associated location in the separate virtual space;
f) the operating system mapping a third address range in the first address space to a fourth address range of the separate virtual space, then the application program accessing and the operating system transferring new data in the third range as in steps (d) and (e);
g) continuing to map, access and transfer data;
h) the operating system, in response to an application program request, saving changed data accumulated in the separate virtual space on the linear data set in external storage.

2. The method of claim 1 in which the separate virtual space is a data space.

3. The method of claim 1 in which the separate virtual space is a non-main storage data space.

4. The method of claim 1 in which the separate virtual space is a logically linked assemblage of at least two non-main storage data spaces.

5. In a central processing complex comprising a CPU, main storage, non-main storage, system resources connected to the CPU and the main storage, and an operating system supporting multiple virtual storage spaces, each uniquely associated with a segment table and page tables, a method for mapping virtual address ranges comprising the steps of:
   a) identifying a first addressing range in a first virtual storage space, said first addressing range comprising a first plurality of virtual addresses;
   b) identifying a second addressing range in a second virtual storage space, said second addressing range comprising a second plurality of virtual addresses;
   c) indicating, by a first map indication means, that a reference to a first virtual address within the first addressing range is to be interpreted as a reference to a second virtual address within the second address range.

6. The method of claim 5 further comprising the steps of:
   d) identifying a third addressing range in a third virtual storage space;
   e) indicating, by a second map indication means, that a reference to a virtual address within the second addressing range is to be interpreted as a reference to a virtual address within the third addressing range, so that a reference to a virtual address within the first addressing range effectively results in a reference to a virtual address within the third addressing range.

7. A method for operating a computer, having a controlling operating system, and having a program executing under control of the operating system, comprising the steps of:
   a) writing data from an address space to a virtual storage means;
   b) identifying a first addressing range in the address space;
   c) identifying a second addressing range in the virtual storage means;
   d) indicating, by a first map indication means, that a reference to a virtual address within the first addressing range is to be interpreted as a reference to a virtual address within the second addressing range;
   e) referencing a portion of said written data by referencing a virtual address in the first address range;
   f) continuing to write additional data, identify ranges, and reference data.

8. The method of claim 7 in which the storage means comprises a non-main storage data space.

9. The method of claim 7 in which the storage means comprises multiple, logically linked, non-main storage data spaces.

10. In a central processing complex comprising a CPU, main storage, non-main storage comprising auxiliary storage and expanded storage, system resources connected to the CPU and the main storage, and an operating system, a system for mapping data comprising:
   a) a virtual address space;
   b) an application program which executes in the virtual address space;
   c) a window in the virtual address space;
   d) a linear data set residing on auxiliary storage containing data to be accessed by the application program, said linear data set not being a system paging data set;
   e) virtual storage means, separate from the virtual address space, for temporarily storing changes made by the application program to the linear data set;
   f) first mapping means in the virtual address space for mapping the linear data set to a first address range in the virtual storage means;
   g) second mapping means in the virtual address space for mapping a subset of the first address range to the window;
   h) first address resolution means, linked to said second mapping means, for resolving a reference by the application program to a virtual address in the window to a resultant virtual address in the storage means;
   i) second address resolution means, linked to said first mapping means, for resolving the resultant virtual address in the storage means to a non-main storage address in the linear data set of a page containing the data to be accessed.

11. The system for mapping data of claim 10 in which the virtual storage means comprises a single non-main storage data space.

12. The system for mapping data of claim 10 in which the virtual storage means comprises:
   a) at least two non-main storage data spaces;
   b) linking means for logically connecting the non-main storage data spaces so that the non-main storage data spaces are mapped onto disjoint but contiguous portions of the linear data set.

13. The system of claim 11 or claim 12 in which the first address resolution means comprises a page table entry, associated with said referenced virtual address, containing the address of a first map control block, said first map control block containing means for computing the resultant virtual address.

14. The system of claim 13 in which the second address resolution means comprises a page table entry associated with said resultant virtual address, containing a first non-main storage address of a backing page containing the data to be accessed if the page containing the resultant virtual address had previously been saved in the storage means, and contains an address of a second map control block if the page containing the resultant virtual address has not previously been saved in the storage means, said second map control block containing means for computing a second non-main storage address on said linear data set of the data to be accessed.

* * * * *